United States Patent [19]

Adachi et al.

[11] Patent Number: 5,489,143
[45] Date of Patent: Feb. 6, 1996

[54] ARM REST DEVICE

[75] Inventors: Takao Adachi, Kyoto; Naomi Matoba; Masayuki Katoh, both of Toyota; Hiroshi Suzuki, Nishikamo, all of Japan

[73] Assignee: Suncall Corporation, Kyoto, Japan

[21] Appl. No.: 304,471

[22] Filed: Sep. 6, 1994

[30] Foreign Application Priority Data

Sep. 6, 1993 [JP] Japan ................. 5-220778
Aug. 10, 1994 [JP] Japan ................. 6-187997

[51] Int. Cl.$^6$ ................. A47C 7/54; B60N 2/46
[52] U.S. Cl. ................. 297/411.38; 297/411.32; 74/538
[58] Field of Search ................. 297/411.38, 411.32; 74/538

[56] References Cited

U.S. PATENT DOCUMENTS

| | | | |
|---|---|---|---|
| 3,310,995 | 3/1967 | Buchwald | 74/538 X |
| 4,138,905 | 2/1979 | Konishi | 74/538 X |
| 4,429,590 | 2/1984 | Kopich | 74/538 X |
| 4,435,011 | 3/1984 | Hakamata | 297/411.32 X |
| 4,496,190 | 1/1985 | Barley | 297/411.32 X |
| 4,621,864 | 11/1986 | Hill | 297/411.38 X |
| 4,655,501 | 4/1987 | Ishigami et al. | 297/411.32 X |
| 4,674,790 | 6/1987 | Johnson | 297/411.38 X |
| 4,819,501 | 4/1989 | Kraus et al. | 74/538 |
| 4,828,323 | 5/1989 | Broderson et al. | 297/411.38 X |
| 4,854,187 | 8/1989 | Walters | 74/538 X |
| 4,876,914 | 10/1989 | Kanno | 74/538 |
| 4,881,424 | 11/1989 | Clark et al. | 297/411.38 X |
| 4,946,226 | 2/1990 | Hurn et al. | 297/411.38 |
| 5,001,942 | 3/1991 | Boyer | 74/538 X |
| 5,067,366 | 11/1991 | Gandiglio | 74/538 X |
| 5,076,645 | 12/1991 | Yokota et al. | 297/411.32 |
| 5,178,237 | 1/1993 | Ursel et al. | 74/538 X |

Primary Examiner—Laurie K. Cranmer
Assistant Examiner—Rodney B. White
Attorney, Agent, or Firm—Nikaido, Marmelstein, Murray & Oram

[57] ABSTRACT

A ratchet 3 is secured to a rotatable base plate structure 2 of an arm rest device 20. A Y-shaped pawl member 7 is pivotally attached to a stationary plate 6 by a pivot shaft 14 and a toggle spring 8. The stationary plate 6 includes a proximal end portion fitted over a fixation shaft 5. A tooth pawl 13 formed in one end portion of the Y-shaped pawl member 7 is engaged with a row of serrated teeth 10 of the ratchet 3 within a predetermined extent (from point A to point B) of pivotal movement of the base plate structure 2, by reason of urging load P from the toggle spring 8. Thus, the arm rest body 18 is fixed at a predetermined position. An engagement groove 32A in the Y-shaped lever 32 prevents the arm rest body in an accommodated position from being pivoted in a forward direction.

3 Claims, 10 Drawing Sheets

ARM REST DEVICE

FIELD OF THE INVENTION

The invention relates to an arm rest device which is able to be pivoted and accommodated. More particularly, the invention relates to an angle adjustment mechanism for continuously changing an inclined/raised angle of an arm rest body of an arm rest device mounted on a seat of a vehicle in a substantially stepless manner within a predetermined extent of pivotal movement, and to an arm rest locking mechanism for preventing the arm rest body in a raised or accommodated position from being pivotally protruded in a forward direction due to impact upon collision of such a vehicle.

BACKGROUND OF THE INVENTION

An arm rest device for seats of an automobile according to prior art employs a mechanism of a shaft lock system for adjusting an inclined/raised angle of an arm rest, as described for example in Japanese Utility Model Public Disclosure (KOKAI) No. 2-52643. Such a shaft lock system typically employs a coil spring, provided around a support shaft for permitting pivotal movement of the arm rest, as means for pivoting and positioning the arm rest, the coil spring having an inner diameter slightly smaller than an outer diameter of the support shaft. The support shaft with the coil spring fitted thereover is secured to the arm rest body. One end of the coil spring is secured to the arm rest body and the other end of the coil spring is rotated in a direction opposite to the direction in which the coils of the spring are wound, so as to increase the inner diameter of the coil spring to a diameter larger than the cuter diameter of the support shaft. By this, fastening force of the coil spring is reduced, so that relative movement between the support shaft and the coil spring is permitted, whereby the arm rest body may be pivoted. On the contrary, and when the other end of the coil spring is rotated in a direction in which the coils of the spring are wound, the inner diameter of the coil spring is reduced so as to increase a fastening force acting on the support shaft. By this, the support shaft and the coil spring are returned to a condition in which relative movement therebetween is not permitted. Thus, the arm rest body may be fixed at a predetermined stop position.

SUMMARY OF THE INVENTION

With the above shaft lock system, it is necessary to release the locked condition provided by the coil spring when it is intended to pivotally move the arm rest body in a predetermined position to a new position. To this end, the arm rest device in prior art is provided with an unlock mechanism consisting of a plurality of constructional parts. Thus, the arm rest device in prior art is problematic in terms of complicated construction, increased weight, and increased production cost.

Accordingly, one object of the invention is to provide a simple construction capable of adjusting an angle of the arm rest body substantially in stepless manner.

It is also noted that the arm rest device in prior art does not include any device for locking the arm rest body in a raised or accommodated position. Thus, it is likely for such arm rest body to be pivotally protruded in a forward direction to give a damage to an occupant of a vehicle when sufficient amount of impact is caused upon collision of a vehicle. In this regard, it should be noted that the member nations of the European Community (EC) require, for the purpose of ensuring occupants of a vehicle against danger in the event of unexpected accident, such as collision, that the arm rest be provided with a locking and protrusion preventing mechanism capable of enduring an instantaneous impact load of 20 G, so that the arm rest body in its raised and accommodated position will not be protruded forwardly when it is unexpectedly subjected to a load of 20 G.

The second object of the invention is to employ a lock mechanism, as one of the countermeasures for the above legal regulations, into an arm rest device including a combination of a Y-shaped pawl member and a ratchet, the lock mechanism preventing the arm rest body in a raised and accommodated position from being unexpectedly protruded in a forward direction upon collision of a vehicle.

In accordance with the invention, a base plate structure having a ratchet therein is attached to a rotatable frame integral with an arm rest body. A Y-shaped pawl member and a toggle spring are attached to a stationary plate secured to a seat frame. The stationary plate is formed with a rib. A Y-shaped lever mounted on the base plate structure includes an engagement groove adapted to be meshingly engaged with the rib.

In a section in which a row of serrated teeth of the ratchet and a tooth pawl formed in one end of the Y-shaped pawl member are oppositely positioned, the toggle spring biassingly urges the tooth pawl toward the row of serrated teeth, so as to maintain the tooth pawl and the row of serrated teeth in an engaged relationship. Thus, the arm rest body may be fixed at a predetermined stop position. In a section in which the row of serrated teeth and the tooth pawl formed in one end of the Y-shaped pawl member are not oppositely positioned, the toggle spring urges the tooth pawl away from the row of serrated teeth. Thus, the arm rest body may be maintained in a pivotally movable state.

When the arm rest body is accommodated in a space between the seat frames of the seat backs, the lower end of the stationary plate is engaged within the engagement groove formed in the first end of the Y-shaped lever, so that protrusion of the arm rest body due to an unexpected impact load may be prevented. When it is intended to withdraw the arm rest body from a space between the seat frames of the seat backs to a usable position, an unlock rod is depressed against the tensile biassing force from the biassing spring, so as to release engagement between the stationary plate and the engagement groove. Then, the arm rest body is fixed at a predetermined position by changing an engaged position between a protrusion formed in a third end portion of the Y-shaped member and the row of serrated teeth.

DETAILED DESCRIPTION OF THE PREFERRED EMBODIMENTS

Figure 1:
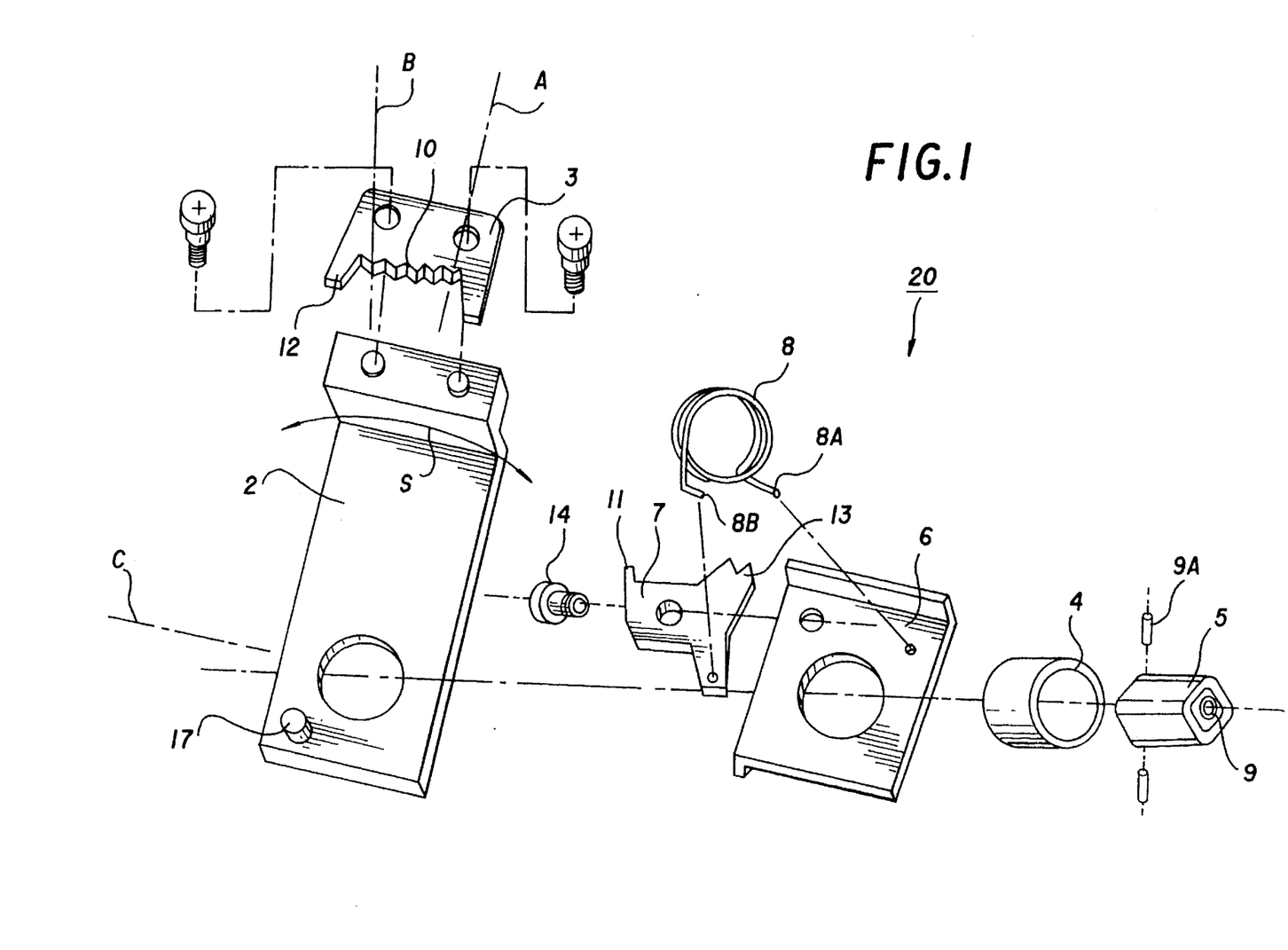
FIG. 1 is an exploded perspective view of an arm rest device according to the invention.
Figure 2:
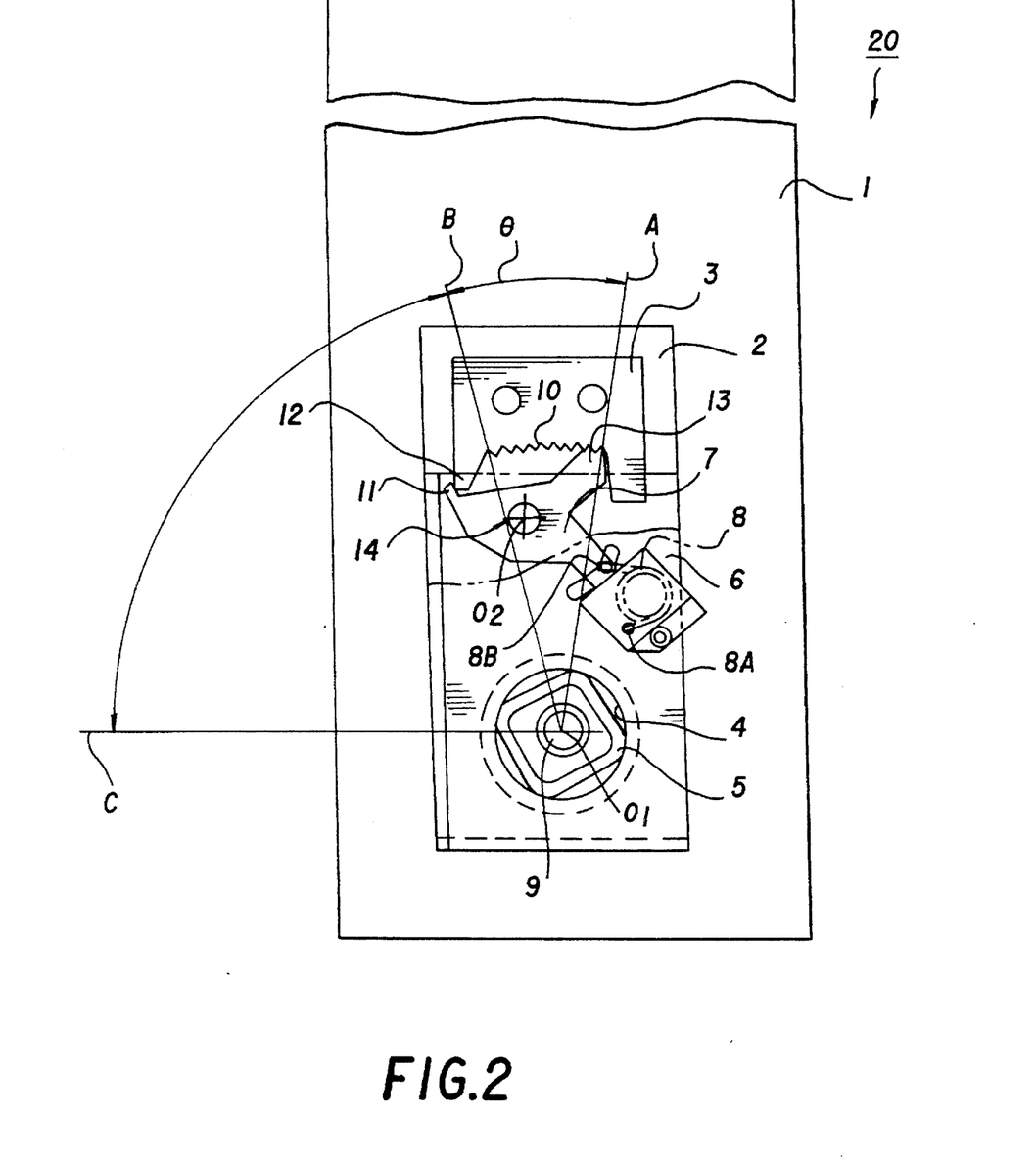
FIG. 2 is a front elevational view of the arm rest device of FIG. 1.
Figure 7:
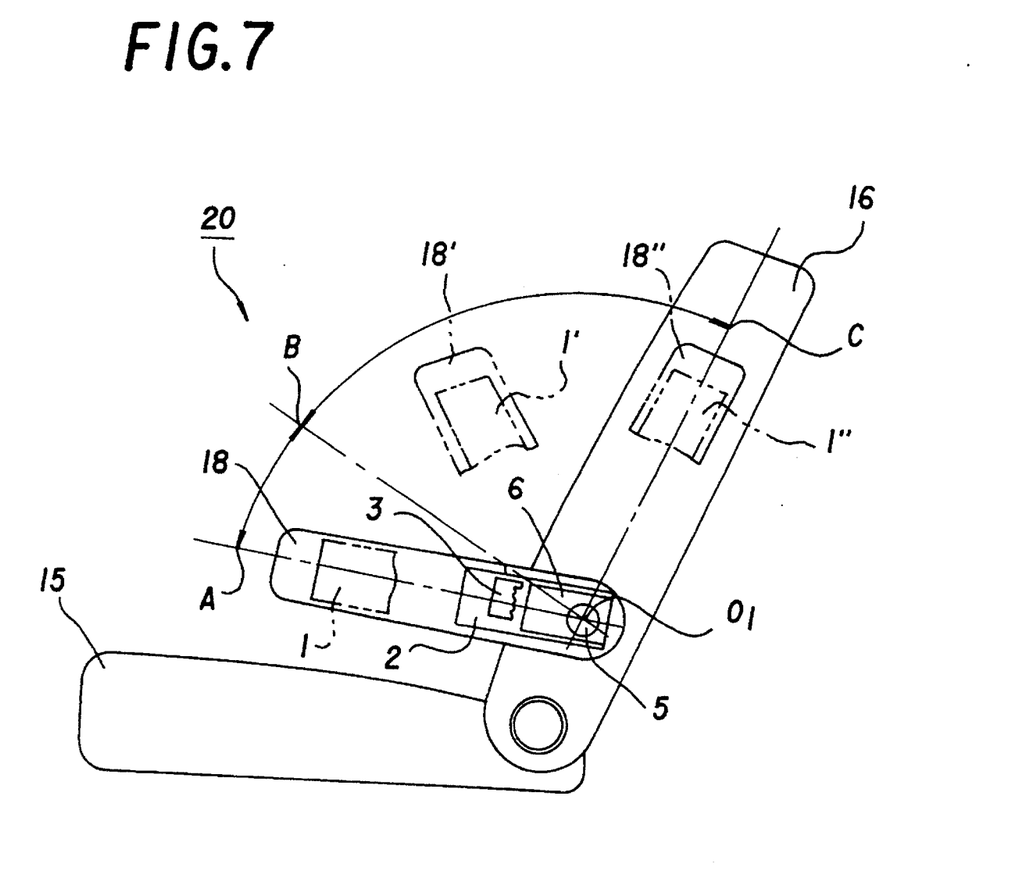
FIG. 7 is a view illustrating operational sequence of the arm rest device.

An arm rest device 20 comprises an adjustment mechanism for controlling an inclination (inclined and raised) angle of an arm rest body 18, the adjustment mechanism including, as shown in FIGS. 1, 2 and 7, a base plate structure 2 having a proximal end pivotally fitted over a fixation shaft 5 protruding laterally from one lateral end of a seat frame 16 of a seat back into a shaft guide 4 for permitting pivotal movement of the frame, a stationary plate 6 having a proximal end fixedly fitted over the fixation shaft 5 and secured to the seat frame 16 by means of a fastening nut 9 and a securing pin 9A, a pawl member 7 of a Y-shaped configuration pivotally attached to the stationary plate 6 through a pivot shaft 14, a toggle spring 8 having one end 8A pivotally fitted into and supported by the stationary plate 6 and the other end 8B pivotally fitted into a support hole formed in a first end portion of the Y-shaped pawl member 7, and a ratchet 3 secured on the base plate structure 2, the ratchet 3 having, in a surface opposite to a tooth pawl 13 formed in a second end portion of the Y-shaped pawl member 7, a row of serrated teeth 10 arranged in an arcuate manner, and having, in an end portion B of the row of serrated teeth, a protrusion 12, arranged opposite to a protrusion 11 formed in a third end portion of the Y-shaped pawl member, for permitting release and commencement of engagement.

When the base plate structure 2, on which the ratchet 3 is secured, is rotated around the stationary plate 6 using the fixation shaft 5 as a center of rotation, as shown by an arrow mark S in FIG. 1, so as to put the tooth pawl 13 engaged with the row of serrated teeth, the arm rest device 20 is securely fixed in a desired position between a fixed, maximum extended position A and a fixed, minimum extended position B.

On the other hand, and when the base plate structure 2 is rotated about the fixation shaft 5, while releasing the engagement between the row of serrated teeth 10 and the tooth pawl 13, the arm rest device 20 is accommodated within a space between the seat frames 16 of the seat backs.

Figure 4A:
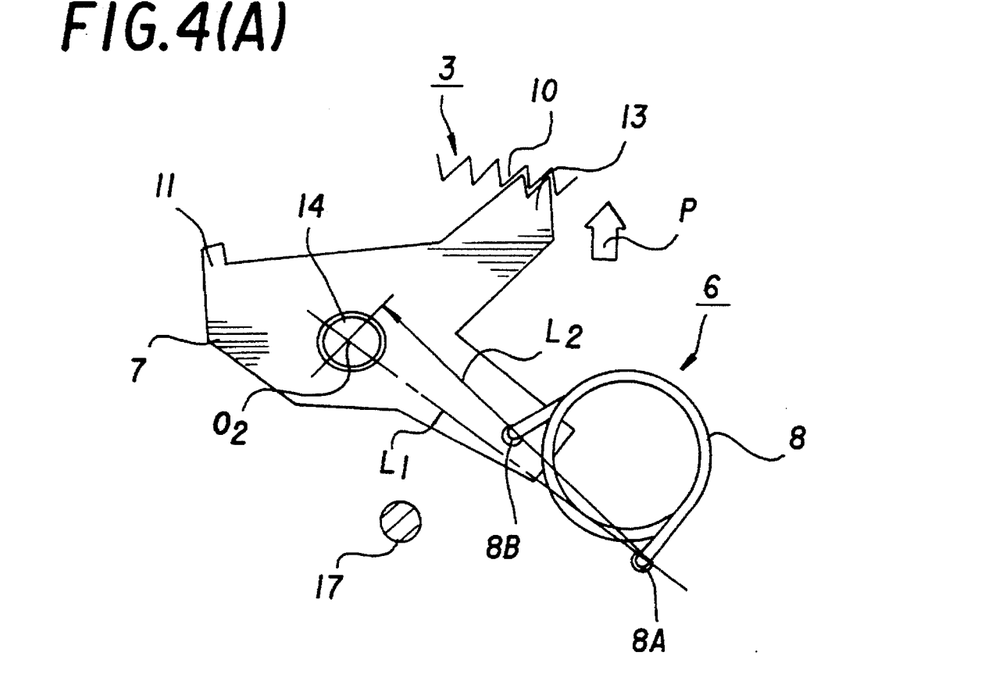
FIG. 4(A) is a front view illustrating a meshingly engaged relationship between a Y-shaped pawl member and a ratchet.
Figure 4B:
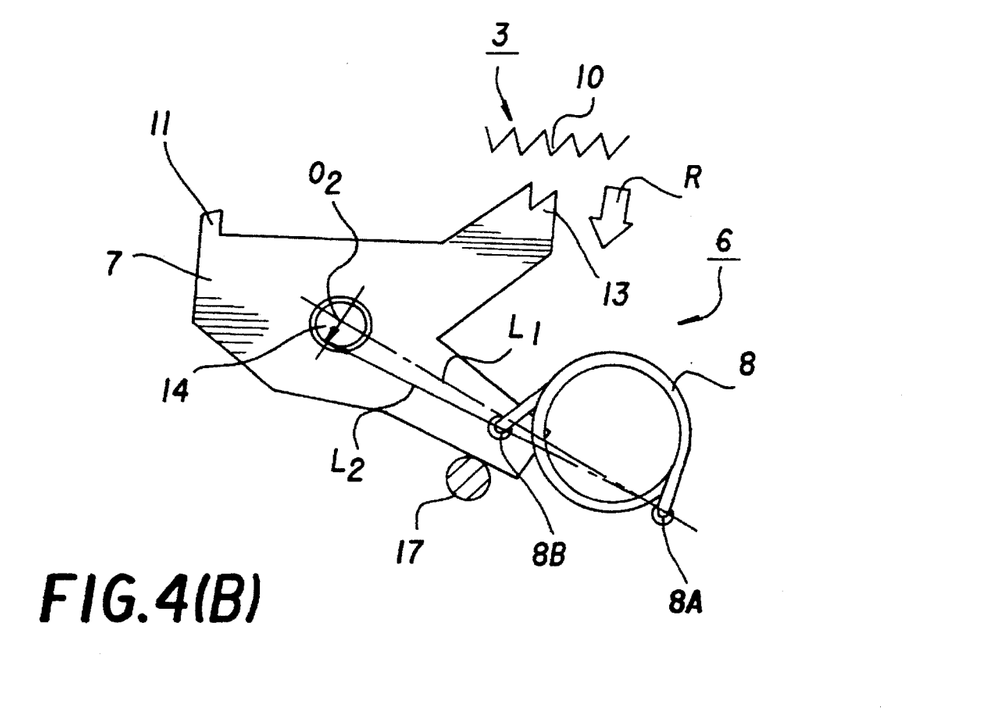
FIG. 4(B) is a front view illustrating a disengaged relationship between the above members.
Figure 5A:
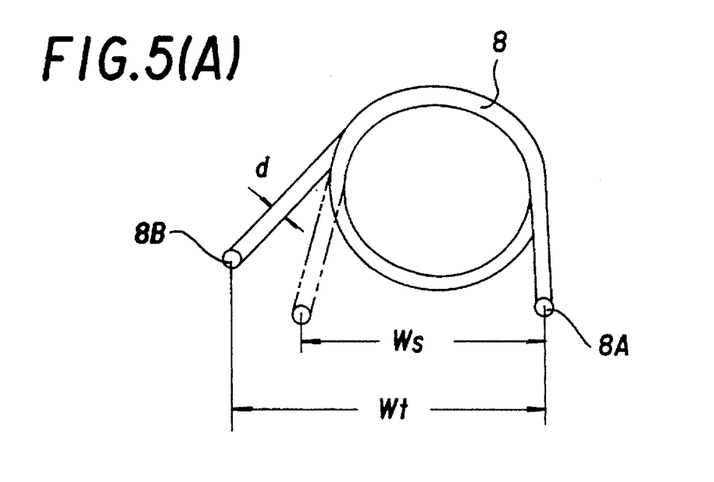
FIG. 5(A) is a front view of a toggle spring.
Figure 5B:
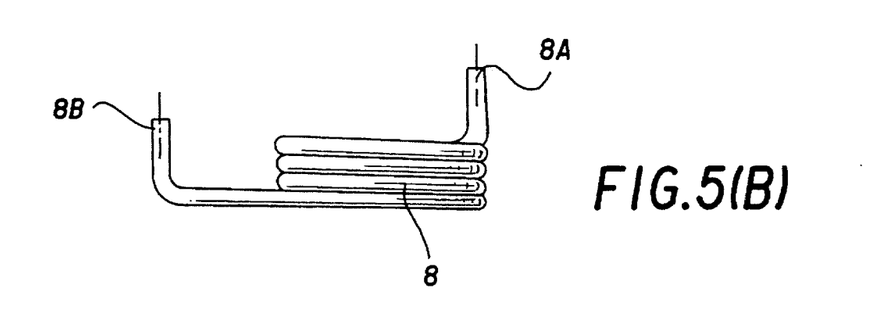
FIG. 5(B) is a side elevational view of the toggle spring.
Figure 6:
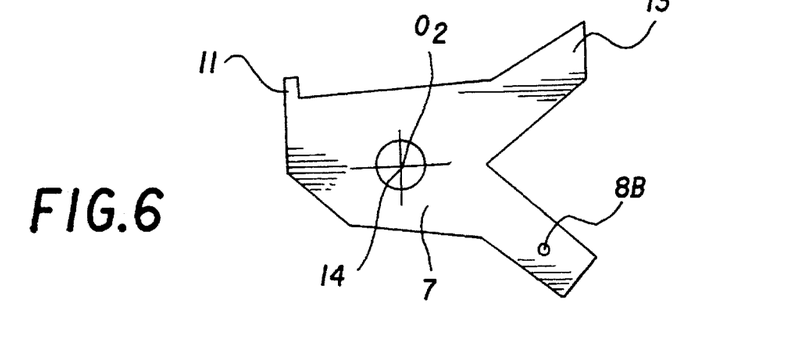
FIG. 6 is a front view illustrating a variation of the Y-shaped pawl member.

The toggle spring 8 is a positive biassing member formed from a spring steel of a small diameter and of a circular cross-section wound into a coiled configuration, as shown in FIGS. 4 and 5. The coil diameter and the direction in which the opposite ends of the coil extend are so selected that the distance between the one end 8A and the other end 8B is maintained at Wf during unloaded condition, while, such distance is maintained at Ws which is smaller than Wf when the coil is disposed between the stationary plate 6 and the Y-shaped pawl member 7, whereby a predetermined amount of compression load may be exerted. The toggle spring 8 exerts a predetermined amount of compression load between the stationary plate 6 and the Y-shaped pawl member 7 pivotally disposed around the pivot shaft 14, since, as shown in FIG. 4, the one end 8A is pivotally fitted into a hole formed in the stationary plate 6 and the other end 8B is pivotally fitted into the support hole formed in the first end portion of the Y-shaped pawl member 7.

In the arm rest device 20 mentioned above, the relative positional arrangement between the pivot shaft 14, toggle spring 8, Y-shaped pawl member 7 and ratchet 3 is so adjusted that, in a section (from point A to point B) in which the row of serrated teeth 10 of the ratchet 3 and the tooth pawl 13 formed in the second end portion of the Y-shaped pawl member 7 are maintained in an opposed relationship with each other, a line L2 passing through the one end 8A and the other end 8B of the toggle spring 8 is located upwardly of a line L1 passing through the one end 8A of the toggle spring 8 and the center O2 of the pivot shaft 14, i.e., between the pivot shaft 14 and the row of serrated teeth 10, as shown in FIG. 4(A). Thus, when the base plate structure 2 is rotated about the fixation shaft 5 as a center of rotation through the above section from the point A to the point B, a positive or urging load P toward the ratchet 3 is transmitted to the tooth pawl 13.

The relative positional arrangement between the pivot shaft 14, toggle spring 8, Y-shaped pawl member 7 and ratchet 3, while satisfying the above condition, is also so adjusted that, in a section (from point B to point C) in which the row of serrated teeth 10 of the ratchet 3 and the tooth pawl 13 formed in the second end portion of the Y-shaped pawl member 7 are not maintained in an opposed relationship with each other, the line L2 passing through the one end 8A and the other end 8B of the toggle spring 8 is located below the line L1 passing through the one end 8A of the toggle spring 8 and the center O2 of the pivot shaft 14, i.e., on a side opposite to that shown in FIG. 4(A), as shown in FIG. 4(B). Thus, when the base plate structure 2 is rotated about the fixation shaft 5 as a center of rotation through the section from point B to point C, an engagement release load R, urging the tooth pawl 13 in a direction away from the row of serrated teeth 10, is transmitted to the Y-shaped pawl member 7.

In the course of the above rotational movement, the energy storage capacity of the toggle spring 8 is maximized when the line L2 passing through the one end 8A and the other end 8B of the toggle spring 8 and the line L1 passing through the one end 8A of the toggle spring 8 and the center O2 of the pivot shaft 14 lie one upon another.

Figure 3:
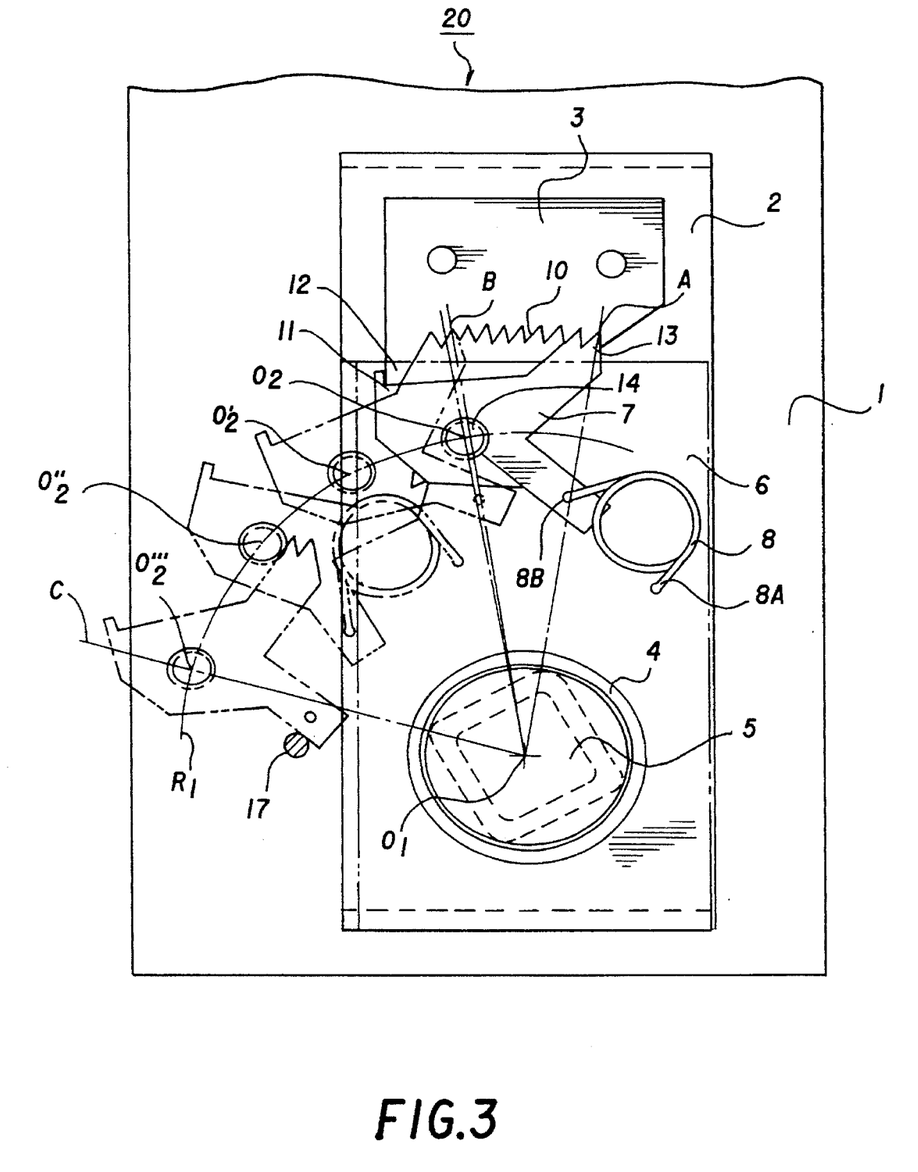
FIG. 3 is a diagrammatical view illustrating operational sequence of the arm rest device in which motion of the movable members relative to the stationary members is reversed.

FIG. 3 is an operational view illustrating change or variation in a relative position between the base plate structure 2 and the ratchet 3, and the Y-shaped pawl member 7 pivotally attached to the stationary plate 6 via the pivot shaft 14 in a manner reversing the actual relative movement of the movable members 2 and 3 between the stationary members 6 and 7, for convenience of illustration. Specifically, it is shown in FIG. 3 that the Y-shaped pawl member 7 is rotated about the fixation shaft 5 in a counter-clockwise direction so as to present or draw a radius of rotation R1, so that the center of the pivot shaft 14 is shifted in the sequence of O2, O'2, O"2 and O'''2. It is noted, however, that, in actual arm rest device 20, the center of the pivot shaft 14 remains unchanged, and thus the rotatable frame 1, and the base frame structure 2 to which the ratchet 3 is secured are rotated in unison about the fixation shaft 5 in a clockwise direction, so that the relative position between the ratchet 3 and the Y-shaped pawl member is sequentially shifted from point A through point B to point C. In FIG. 7, actual movement of the above arm rest device 20 is inclusively illustrated.

In designing the arm rest device 20, and when it is intended to increase an angle (the angular extent θ from point A to point B) for stopping and positioning the arm rest body 18, the width of the ratchet 3 along the row of teeth is increased, or the distance from the center O1 of the fixation shaft 5 to the row of serrated teeth is decreased. On the contrary, and when it is intended to reduce the angle (the angular extent θ from point A to point B) for stopping and positioning the arm rest body 18, the width of the ratchet 3 along the row of teeth is reduced, or the distance from the center O1 of the fixation shaft 5 to the row of serrated teeth 10 is increased.

The angle θ for stopping and positioning the arm rest body 18 may be set at any desired value. It is noted, however, that, in any case, the extent of pivotal movement for the arm rest device 18 is so selected that the engaged relationship between the tooth pawl 13 and the row of serrated teeth 10 is released at point B during the course of pivotal movement from point A to point B, and then the tooth pawl 13 is slidably moved along an inclined inner surface of the protrusion 12 for release of the engagement so as to cause the Y-shaped pawl member 7 to be displaced away from the ratchet 3, so that the base plate structure 2, as well as the arm rest body 18 incorporating the base plate structure 2 therein, may be maintained in a freely rotatable state. When the arm rest body 18 is pivoted from point A to a position 18", the arm rest body 18 is accommodated in a inverted manner within a space laterally of the seat frame 16 of the seat back, as shown in FIG. 7.

When it is intended to return the arm rest body 18 from the accommodated position C to a usable position (a position in the section from point B to point A), the arm rest body 18, together with the base frame structure 2, is counter-rotated about the fixation shaft 5. During the course of the above counter-rotational movement, the protrusion 11 formed in the third end portion of the Y-shaped pawl member is engaged with the protrusion 12 formed in the terminal portion B of the row of serrated teeth 10 so as to cause the Y-shaped pawl member 7 to be oscillated about the pivot shaft 14, so that the tooth pawl 13 is engaged with the row of serrated teeth 10 at the deepest portion of the row of serrated teeth 10, i. e., point A. Then, the arm rest body 18 may be fixedly positioned at a predetermined stop position with a desired inclined angle between point A and point B, by suitably adjusting the position of engagement between the tooth pawl 13 and the row of serrated teeth 10. The configuration of the tooth pawl 13 of the Y-shaped pawl member 7 is modified depending upon the position by which the ratchet 3 is secured and dimensional alignment of the row of serrated teeth 10. Although the Y-shaped pawl member 7 shown in FIGS. 1, 2 and 7 is provided, at the second end portion thereof, with two tooth pawls 13 for the purpose of mechanical strength, it is noted that the scope of protection of the present invention should not be limited by such an exemplified explanation. Rather, the present invention may include a large number of variations as long as a predetermined mechanical strength is ensured. For example, it is possible to use a Y-shaped pawl member 7 having a single tooth pawl 13 of a thickened and sharp configuration at the second end portion.

The toggle spring 8 shown in FIG. 5 is formed from a length of spring steel of a circular cross-section having a wire diameter of 1 mm which has been wound into a coiled configuration with a mean coil diameter of 10 mm and number of coils of 3⅜. This toggle spring is designed to have a spaced distance of 11 mm between the one end 8A and the other end 8B upon installation, and to have a spaced distance of 14 mm during unloaded condition. It is noted, however, that the present invention should not be limited to such an example. Rather, dimensional factors and spring constant for the toggle spring 8 may be appropriately selected depending upon a desired biasing load P acting between the tooth pawl 13 and the row of serrated teeth 10.

In any embodiments, incorporation of the toggle spring 8 into the arm rest device 20 makes it possible to transmit an urging force from the X-shaped pawl member 7 to the ratchet 3 in the section from point A to point B as shown in FIGS. 1, 2 and 7. On the other hand, the tooth pawl 13 of the Y-shaped pawl member 7 urges the row of serrated teeth 10 in a direction of disengagement, i.e., in a direction to release the urging load, in the area or section (the section from point B to point C in FIGS. 1, 2 and 7) in which the tooth pawl 13 is disengaged from the row of serrated teeth 10 of the ratchet 3.

Figure 8:
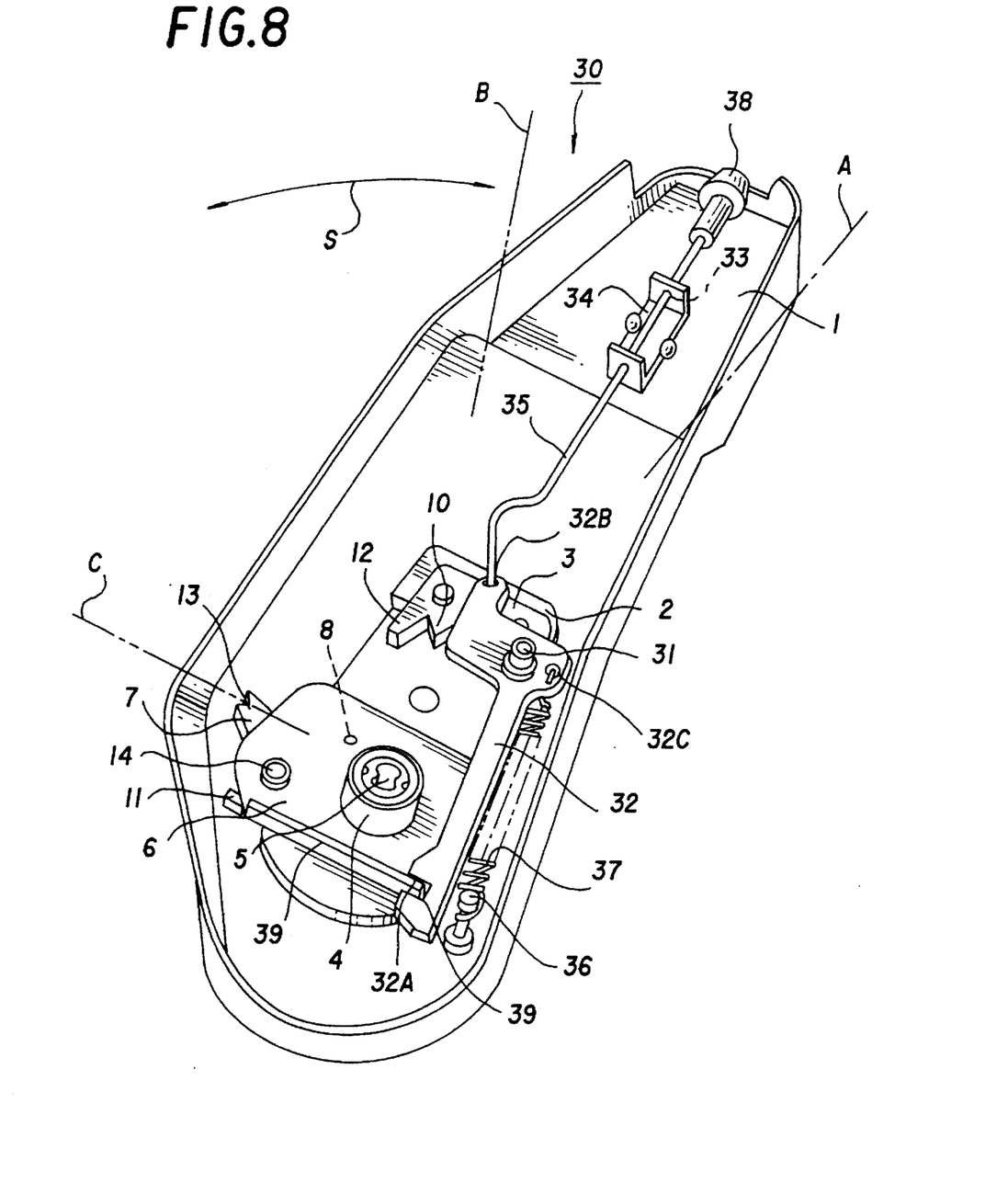
FIG. 8 is a perspective view illustrating a mechanism for locking the arm rest device according to the invention and preventing protrusion thereof.
Figure 9:
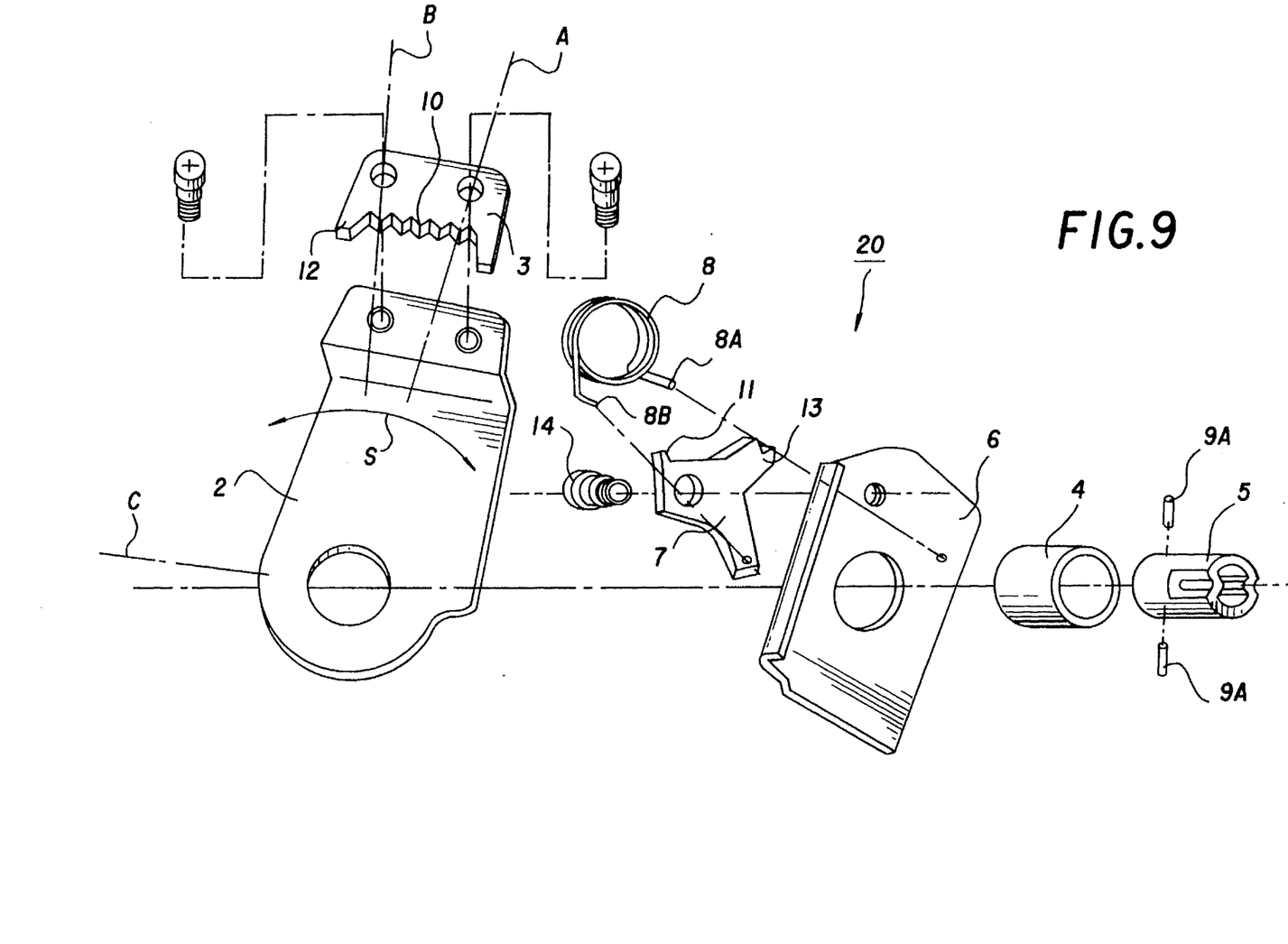
FIG. 9 is an exploded perspective view of an arm rest body.

A lock mechanism for the arm rest body 18 will be explained below. The lock mechanism 30 for the arm rest body 18 includes a Y-shaped lever 32 mounted for pivotal movement. The Y-shaped lever 32 is pivotally supported by the base plate structure 2 by means of a support shaft 31. The Y-shaped lever 32 is formed, at a first end thereof, with an engagement groove 32A in meshing engagement with the stationary plate 6. A guide bracket 34 having holes for permitting a rod therethrough is secured to the rotatable frame 1 fixedly mounting the base plate structure 2 thereon. An unlock rod 35 is, at the upper end thereof, slidably inserted through the holes 33. The unlock rod 35 is, at the lower end thereof, pivotally inserted into a support hole 32B formed in a second end portion of the Y-shaped lever 32. A spring 37 for biassing the Y-shaped lever 32 is disposed between a hole 32 formed in a third end portion of the Y-shaped lever and a pin 36 disposed laterally of the stationary plate 6 and upstanding from the rotatable frame 1 for securing the spring thereto. Reference numeral 38 designates a push button attached to the upper end of the unlock rod 35 for unlocking operation, and reference numeral 39 designates a rib protruding from the lower edge of the stationary plate 6 for being fitted within the engagement groove 32A.

Figure 10A:
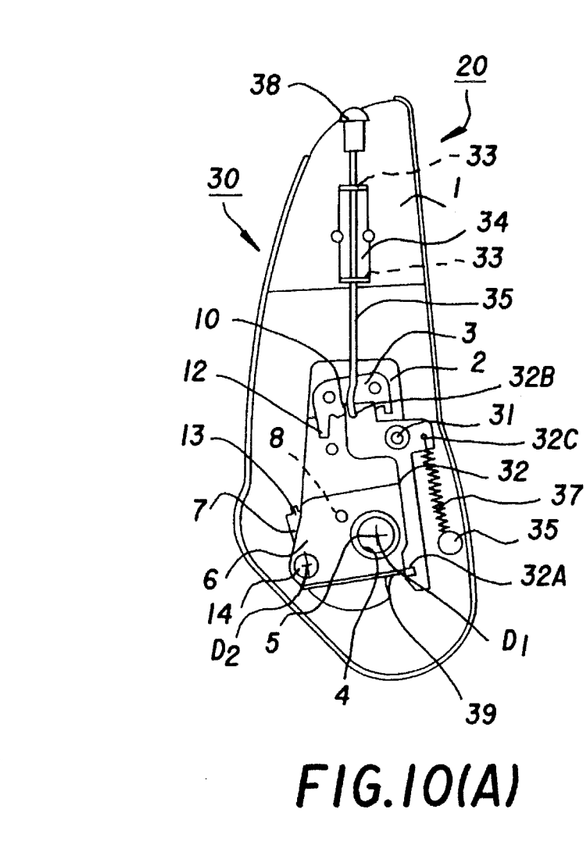
FIG. 10 is a front view illustrating construction and operational sequence of the locking and protrusion prevention mechanism for the arm rest body.
Figure 10B:
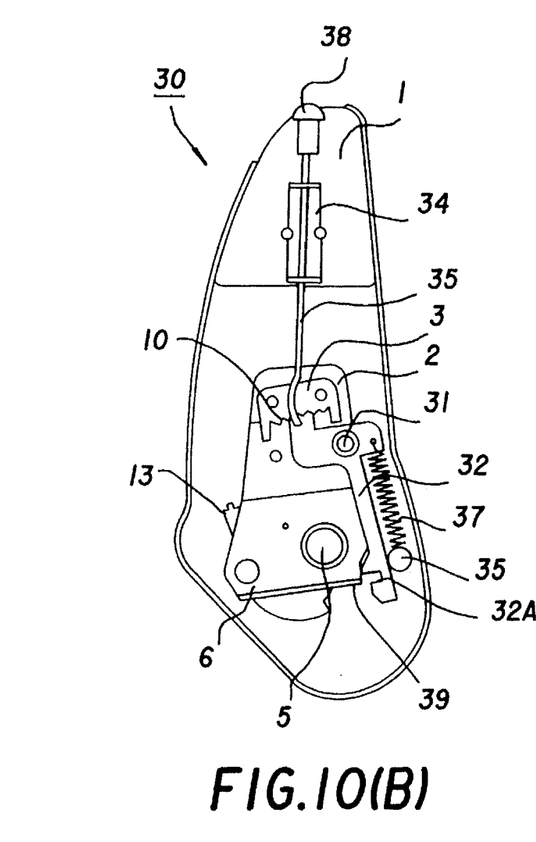
Figure 10C:
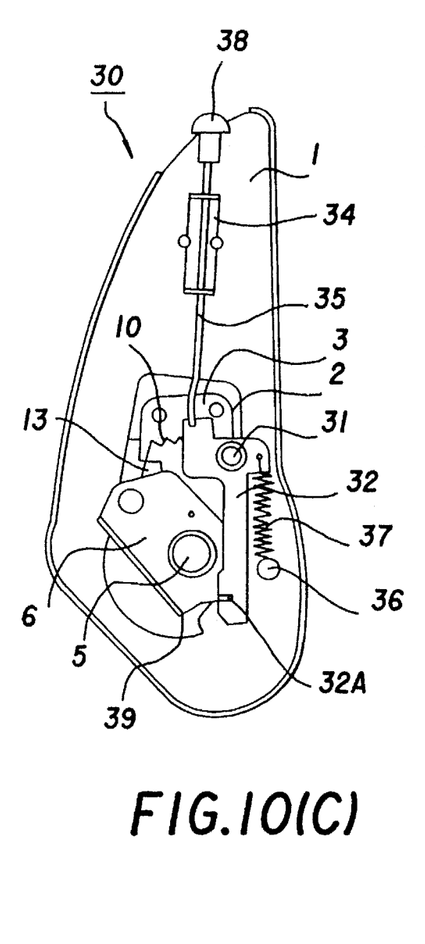
Figure 10D:
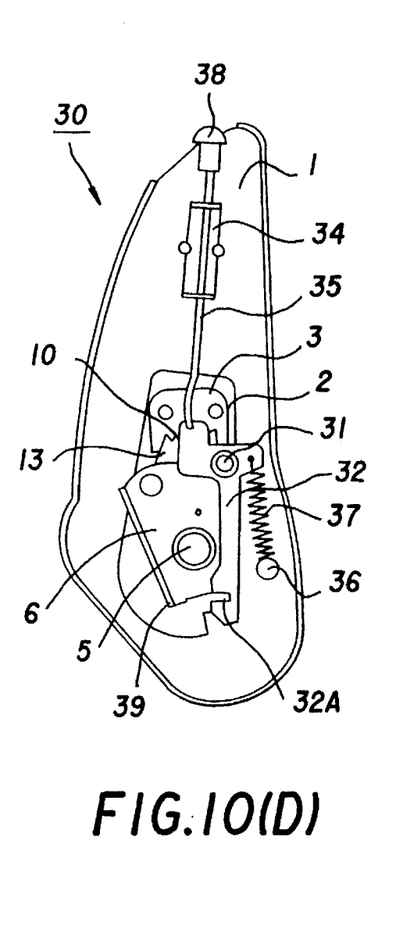
Figure 10E:
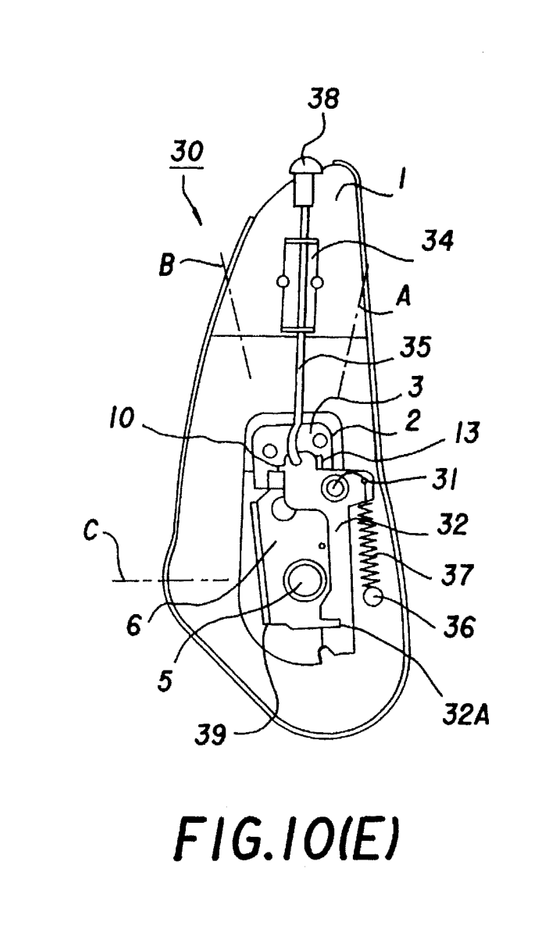

In a position shown in FIG. 10(I) in which the arm rest body 18 is accommodated in a space between the seat frames of the seat backs in an upstanding manner, the rib 39 protruding from the lower edge of the stationary plate 6 is fitted into the engagement groove 32A formed in the first end portion of the Y-shaped lever 32, so as to restrict pivotal movement of the rotatable frame 1 and the base plate structure 2 about the fixation shaft 5, thus preventing the arm rest body 18 from being protruded forwardly upon receiving impact load.

When it is intended to withdraw the arm rest body 18 from a space between the seat frames of the seat backs to a usable position of the arm rest body as shown in FIG. 10(IV) and (V), the button 38 for unlocking operation is depressed against the tensile biassing force from the biassing spring 37, so as to cause a downward slidable movement of the unlock rod 35 which is slidably inserted through the holes 33 in the guide bracket 34. The thus caused downward movement of the unlock rod 35 causes the Y-shaped lever 32 to be rotated about the support shaft 31 in a counter-clockwise direction, so that engagement between the engagement groove 32A and the rib 39 is released. By this, the rotatable frame 1 and the base plate structure 3 are put into a position in which they are able to be withdrawn from the above accommodated position.

In the above condition, the arm rest body 18 is rotated about the fixation shaft 5 in a counter-clockwise direction as shown in FIG. 10(II), (III) and (IV), so as to change the position of the rotatable shaft 1 and the base plate structure 2 relative to the stationary plate 6. Immediately after the commencement of rotation of the arm rest body 18 in the counter-clockwise direction, the button 38 for unlocking operation is released. By this, a tensile biassing force of the biassing spring 37 is transmitted to the Y-shaped lever 32 as shown in FIG. 10(II) through (V), so that the Y-shaped lever 32 is rotated about the support shaft 31 in a clockwise direction, so as to be returned to the original position shown in FIG. 10(I).

The rotational movement of the arm rest body 18 in the counter-clockwise direction mentioned above also causes the tooth pawl 13 formed in the second end portion of the Y-shaped pawl member 7 to be brought closer to the row of serrated teeth 10 of the ratchet 3 secured to the base plate structure 2. FIG. 10(III) illustrates that the tooth pawl 10 has climbed over the protrusion 12 formed in the terminal portion of the row of serrated teeth 10 and advanced into an area opposite to the row of serrated teeth 10, and FIG. 10(IV) illustrates that the tooth pawl 12 formed in the second end portion of the Y-shaped pawl member 7 and the row of serrated teeth 10 provided in the ratchet 3 are meshingly engaged with each other so that the arm rest body 18 is fixed at a desired, intermediate position.

When the arm rest body 18 is further rotated in the counter-clockwise direction, the position of engagement between the tooth pawl 13 and the row of serrated teeth 10 is shifted along the line of the row of serrated teeth on which the teeth are aligned, and consequently the tooth pawl 13 is maintained in a meshingly engagement relationship with the row of serrated teeth 10 in the deepest portion of the row, as shown by reference character A in FIG. 10(V). Thus, the arm rest body 18 having been withdrawn from a space between the seat frames of the seat backs is fixed at the maximum inclined angle.

When it is intended to return the arm rest body 18 to the accommodated position, the arm rest body 18 is rotated about the fixation shaft 5 in the clockwise direction. At the end of the above rotation in the clockwise direction, the rib 39 formed in the stationary plate 6 and the engagement groove 32A formed in the Y-shaped lever 32 are automatically engaged with each other as shown in FIG. 10(I), so that the arm rest body 18 is fixed at a position between the seat frames of the seat backs, as shown in FIG. 10(I).

In the above state, a load is acted between the Y-shaped lever 32 and the stationary plate 6 by reason of a tensile biassing force from the biassing spring 37, the load preventing disengagement between the Y-shaped lever and the stationary plate. Thus, the engaged relationship between the rib 39 and the Y-shaped lever will not be released, even when accidental collision of vehicle occurs which may instantaneously give an impact load to the arm rest body 18, so that the arm rest body 18 may be maintained in a position in which it is accommodated in a space between the seat frames of the seat backs.

The arm rest device 20 according to the invention is constructed by combining a base frame structure 2, a stationary plate 6, a Y-shaped pawl member 7, a ratchet 3, a toggle spring 8, a fixation shaft 5 and a pivot shaft 14. The arm rest device permits stepless adjustment of the inclined/raised angle θ of the arm rest body 18, without the use of the complicated unlock mechanism which is indispensable to the arm rest device in prior art. Omission of the unlock mechanism in prior art permits simplification in the construction of operative part of the arm rest device. It is also noted that reduction in number of parts permits production of light weight device, as well as increased space of the arm rest portion. As a result, less troublesome and more convenient arm rest is provided.

In accordance with the present invention, a lock mechanism for the arm rest body 18 is constituted by assembling a Y-shaped lever 32 and an unlock rod 35 by means of a biassing spring 37 into a unitary construction. Thus, the arm rest body 18 is restricted from jumping out of its accommodated position, even when an accidental collision of a vehicle occurs which may instantaneously give a large amount of impact load to the arm rest body 18, so that safety for occupants of the vehicle are ensured.

We claim:

1. An arm rest device comprising a mechanism for adjusting an inclined/raised angle of an arm rest body, the mechanism including a base plate structure having a proximal end portion fitted rotatably over a fixation shaft protruding laterally from one lateral end of a seat frame of a seat back, a stationary plate having a proximal end portion fitted over said fixation shaft, a Y-shaped pawl member pivotally attached to said stationary plate by a pivot shaft, a toggle spring having one end fitted into and pivotally supported by said stationary plate and the other end pivotally fitted into a support hole formed in a first end portion of said Y-shaped pawl member, and a ratchet secured to said base plate structure, said ratchet having, in a surface thereof opposed to a tooth pawl formed in a second end portion of said Y-shaped pawl member, a row of serrated teeth arranged in an aligned manner, and a protrusion in a terminal portion of said row of serrated teeth for permitting release and commencement of engagement between said tooth pawl and the row of serrated teeth.

2. An arm rest device according to claim 1, wherein said toggle spring and said first end portion of said y-shaped pawl are arranged such that biassing by said toggle spring of said tooth pawl 13 toward said row of serrated teeth occurs in a section where said row of serrated teeth of said ratchet and said tooth pawl formed in the second end portion of said Y-shaped pawl member are opposed relative to one another, and biassing by said toggle spring of said tooth pawl away from said tooth of serrated teeth occurs in a section where said row of serrated teeth and said tooth pawl are not opposed relative to one another.

3. An arm rest device according to claim 1, further comprising means for locking an arm rest, said locking mechanism including a Y-shaped lever pivotally attached to said base plate structure by means of a support shaft, said Y-shaped lever having in a first end portion thereof an engagement groove for engaging with said stationary plate, a guide bracket secured to a rotatable frame on which said base plate structure is fixedly supported, said guide bracket having a hole, and unlock rod slidably inserted through said hole of said guide bracket and having a lower end pivotally fitted into a support hole formed in a second end portion of said Y-shaped lever, and a spring for biassing said Y-shape lever, said spring being extended between a hole formed in a third end portion of said Y-shaped lever and a pin disposed laterally of said stationary plate and upstanding from said rotatable frame for securing said spring thereto.

\* \* \* \* \*